United States Patent
Mackie

(10) Patent No.: US 6,711,996 B1
(45) Date of Patent: Mar. 30, 2004

(54) HAY CONDITIONING APPARATUS

(75) Inventor: Peter Gilbert Mackie, New Norcia (AU)

(73) Assignee: Mackie International Pty Ltd (AU)

( * ) Notice: Subject to any disclaimer, the term of this patent is extended or adjusted under 35 U.S.C. 154(b) by 0 days.

(21) Appl. No.: 10/048,673

(22) PCT Filed: Sep. 15, 2000

(86) PCT No.: PCT/AU00/01105

§ 371 (c)(1),
(2), (4) Date: Jun. 7, 2002

(87) PCT Pub. No.: WO01/19164

PCT Pub. Date: Mar. 22, 2001

(30) Foreign Application Priority Data

Sep. 16, 1999  (AU) ............................................. PQ2896

(51) Int. Cl.⁷ .............................. A01D 61/00; B30B 3/04
(52) U.S. Cl. .................... 100/169; 100/171; 56/16.4 B; 56/1
(58) Field of Search ................................ 100/35, 70 A, 100/155 R, 163 R, 169, 170, 176, 171; 56/DIG. 1, DIG. 2, 14.1, 16.4 A, 16.4 B, 1

(56) References Cited

U.S. PATENT DOCUMENTS

| | | | | |
|---|---|---|---|---|
| 2,921,426 A | * | 1/1960 | Heth ............................... | 56/1 |
| 3,007,297 A | * | 11/1961 | Halls et al. ...................... | 56/1 |
| 4,035,991 A | * | 7/1977 | Oosterling et al. .............. | 56/1 |
| 4,546,599 A | * | 10/1985 | Cicci et al. .............. | 56/16.4 R |
| 4,896,483 A | * | 1/1990 | O'Halloran et al. ............. | 56/1 |
| 4,910,947 A | * | 3/1990 | Seymour ................. | 56/16.4 R |
| 5,269,124 A | * | 12/1993 | Barthel et al. ........... | 56/16.4 B |
| 5,950,938 A | * | 9/1999 | Nishizaki et al. ............. | 241/28 |
| 6,050,070 A | * | 4/2000 | Cook .......................... | 56/14.1 |

* cited by examiner

Primary Examiner—Allen Ostrager
Assistant Examiner—Jimmy T Nguyen
(74) Attorney, Agent, or Firm—Ostrolenk, Faber, Gerb & Soffen, LLP

(57) ABSTRACT

A hay conditioning apparatus includes a first roller which is rotatably mounted in a fixed mounting and a second counter-rotating (compression) roller which is rotatably mounted in connection with a moveable mounting. The compression roller is in rolling contact with the first roller and is adapted to receive pre-cut hay therebetween for conditioning. The moveable mounting allows the compression roller to be displaced relative to the first roller as the hay passes between the rollers and also includes a hydraulic cylinder for applying a compression force to the compression roller. As the pre-cut hay passes between the rollers, it is subjected to a predetermined compression force sufficient to substantially flatten any green nodes on the hay and thereby accelerate drying of the hay.

9 Claims, 4 Drawing Sheets

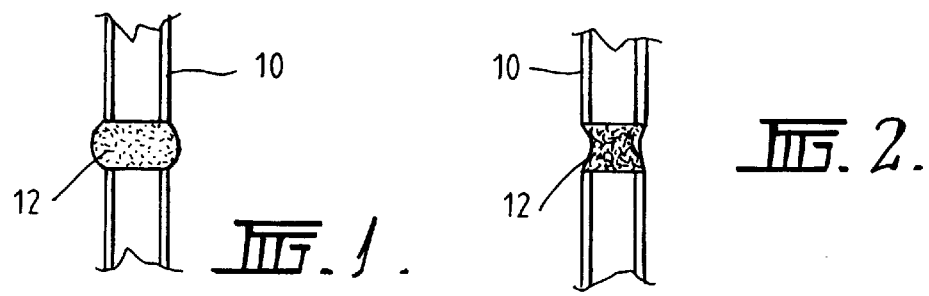
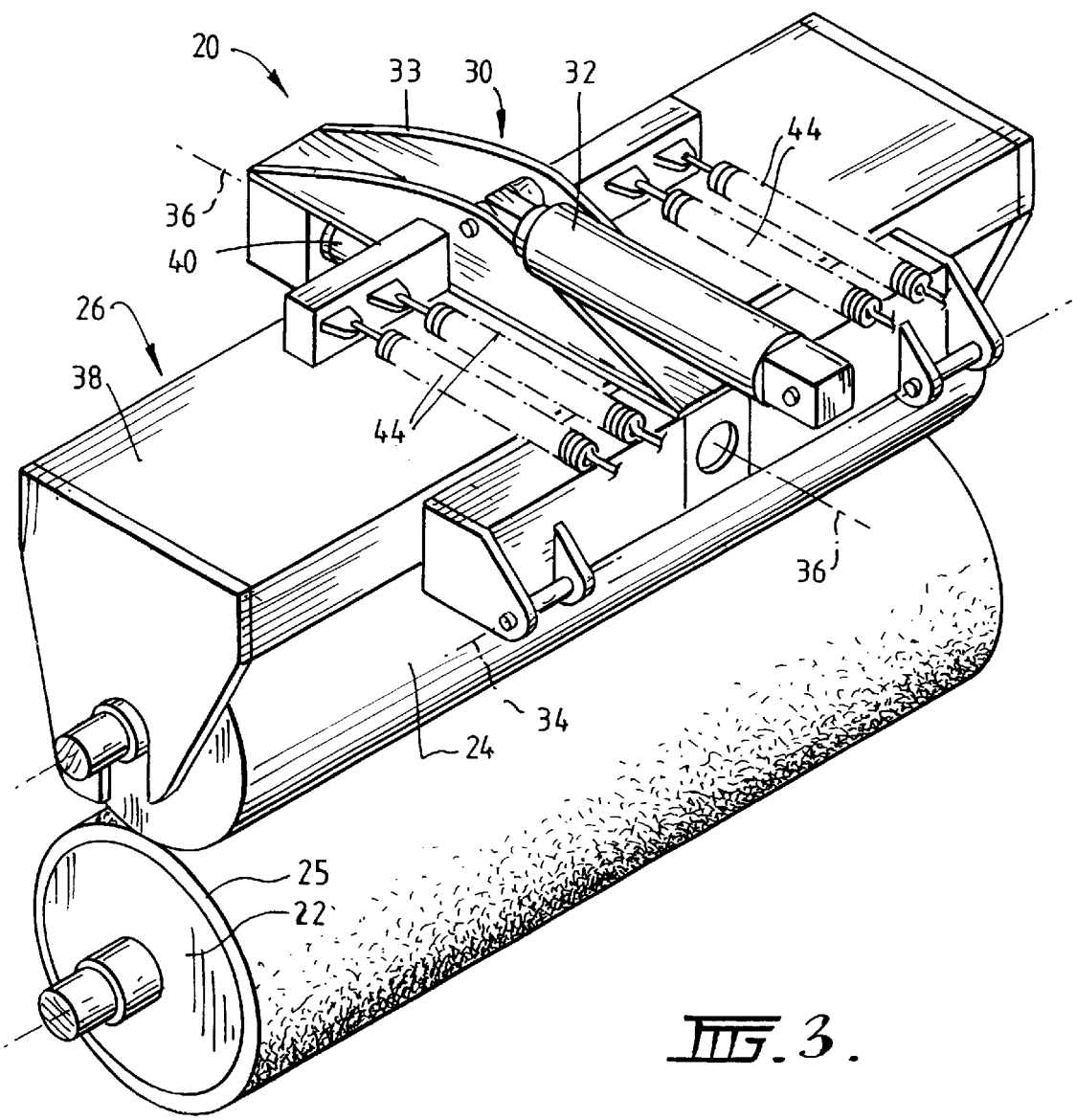

HAY CONDITIONING APPARATUS

FIELD OF THE INVENTION

The present invention relates to an apparatus for conditioning hay and relates particularly, though not exclusively to such an apparatus for conditioning cereals and grasses.

BACKGROUND TO THE INVENTION

Various types of grasses, cereals and other crops are grown to make hay for animal fodder. The grass or cereal is mown or cut and then dried before being baled for storage. The hay may be left to dry in the sun and/or may be subject to conditioning in order to accelerate the process of drying or curing. Oaten hay can take two or more weeks to dry or cure, ie. the time taken between cutting/mowing and the hay being dry enough (12% moisture) to bale. This drying/curing time is when the hay is most vulnerable to damage from rain. Any rain on hay in windrows (after cutting and before baling) will result in damage to the quality of the hay. Every year, many thousands of tonnes of hay are made worthless because of rain on windrows.

Prior art conditioning equipment is typically incorporated within the mower, or alternatively conditioning of the hay may be performed in a separate operation by another machine after the hay has been cut. Conditioning rollers take many forms and all work on the principal of crimping the hay fibres. During crimping of the hay fibres, the stems of the hay are split or cracked open which allows the more rapid egress of moisture from within the stems to atmosphere during drying. To achieve this crimping, prior art conditioners rely on interlocking lugs or ribs on the rollers. One of the most popular designs of traditional conditioner is the CHEVRON™ style of interlocking rubber rollers. In prior art conditioners the rollers can both have steel surfaces or both have rubber lagging or one roller with steel and the other with rubber. Other conditioners use flail-like devices which rely on rotating hammers attached by a chain to a drive shaft.

All grasses and cereals have nodes in their stems. These nodes are full of a fine honeycomb type cellulose material, whereas the stem is in the form of a hollow tube through which nutrients and water are transported to the leaves and head. Unfortunately, traditional hay conditioners have no effect on the nodes. For the production of high quality hay the nodes must be dry before the hay is baled. However, the nodes typically take two or three times longer to dry/cure than the stems and leaves of the grasses and cereals.

SUMMARY OF THE INVENTION

The present invention was developed with a view to providing an improved method and apparatus for conditioning hay in which the nodes are also conditioned.

Throughout this specification the term "comprising" is used inclusively, in the sense that there may be other features and/or steps included in the invention not expressly defined or comprehended in the features or steps subsequently defined or described. What such other features and/or steps may include will be apparent from the specification read as a whole.

According to one aspect the present invention there is provided a method of conditioning hay, the hay being made from plants used for animal fodder of the type having nodes in their stems, the nodes being significantly less compressible than the stems, the method comprising:

compressing the hay between a pair of rollers with a predetermined compression force sufficient to substantially flatten any nodes on the hay and thereby accelerate drying of the hay.

According to another aspect of the present invention there is provided an apparatus for conditioning hay, the apparatus comprising:

a first roller mounted for rotation and a second counter-rotating roller mounted in rolling contact with the first roller, said first and second rollers being adapted to receive pre-cut hay therebetween; wherein said first roller is rotatably mounted in a fixed mounting and said second roller is rotatably mounted in a moveable mounting such that the second roller is displaceable relative to the first roller as the hay passes between the rollers during use; and wherein said moveable mounting comprises a pivotable support arm pivotably mounted at a location spaced from the axis of rotation of the second roller, and a rockable support frame pivotably mounted on said support arm, the second roller being rotatably mounted on said support frame;

the arrangement being such that the suport frame is able to pivot during use about a pivot axis substantially perpendicular to the axis of rotation of the second roller and the second roller s thereby able to rock about said pivot axis in order to facilitate passage between said rollers of an object during use.

Preferably the moveable mounting includes a compression device for applying compression force to the second roller. The compression force applied to the second roller may be variable to suit the type of crop material passing through the apparatus. The compression force may be measured as the linear specific pressure applied to the crop material as it passes between the rollers, and the linear specific pressure may lie within the range of 17 to 32 N/mm. The linear specific pressure applied to the crop material as it passes between the rollers may be between the range of 20 to 30 N/mm.

Preferably, at least one of the first and second rollers is covered with a rubber or synthetic lagging material. The outer surfaces of said first and second rollers may be substantially smooth.

The apparatus may further comprise means for feeding pre-cut hay between said rollers.

According to another aspect of the present invention there is provided an apparatus for conditioning hay, the apparatus comprising:

a first roller mounted for rotation and a second counter-rotating roller mounted in rolling contact with the first roller, said first and second rollers being adapted to receive pre-cut hay therebetween;

wherein said first roller is rotatably mounted in a fixed mounting and said second roller is rotatably mounted on a moveable mounting such that the second roller is displaceable relative to the first roller as hay passes between said rollers during use; and a compression device for applying a compression force to the second roller so as to compress hay as the hay passes through said rollers during use;

wherein said moveable mounting comprises a pivotable support arm pivotably mounted at a location spaced from the axis of rotation of the second roller, and a rockable support frame pivotably mounted on said support arm, the second roller being rotatably mounted on said support frame, the support frame being able to pivot during use about a pivot axis substantially perpendicular to the axis of rotation of the second roller and the second roller is thereby able to rock about said pivot axis in order to facilitate passage between said rollers of an object during use; and wherein during use, as the hay passes between the rollers it is subject to a predetermined compression force sufficient to substantially flatten any nodes on the hay the thereby accelerate drying of the hay.

BRIEF DESCRIPTION OF THE DRAWINGS

In order to facilitate a more comprehensive understanding of the nature of the invention a preferred embodiment of the method and apparatus of hay conditioning will now be described in detail, by way of example only, with reference to the accompanying drawings, in which:

FIG. 1 illustrates a stem of a plant having a green node;

FIG. 2 illustrates a stem of a plant with nodes after drying;

FIG. 3 illustrates a preferred embodiment of the apparatus for conditioning hay in accordance with the present invention;

DETAILED DESCRIPTION OF PREFERRED EMBODIMENT

All grasses and cereals and some other plants used for animal fodder have nodes in their stem. FIG. 1 is an enlargement of a typical plant stem 10 having a node (joint/knuckle) 12 which is still green. The stem 10 is generally hollow and easily split or cracked open, whereas the nodes 12 are less compressible and are typically filled with a matrix of fine honeycomb type cellulose material. As the node 12 dries it shrinks in volume as illustrated in FIG. 2.

Figure 4:
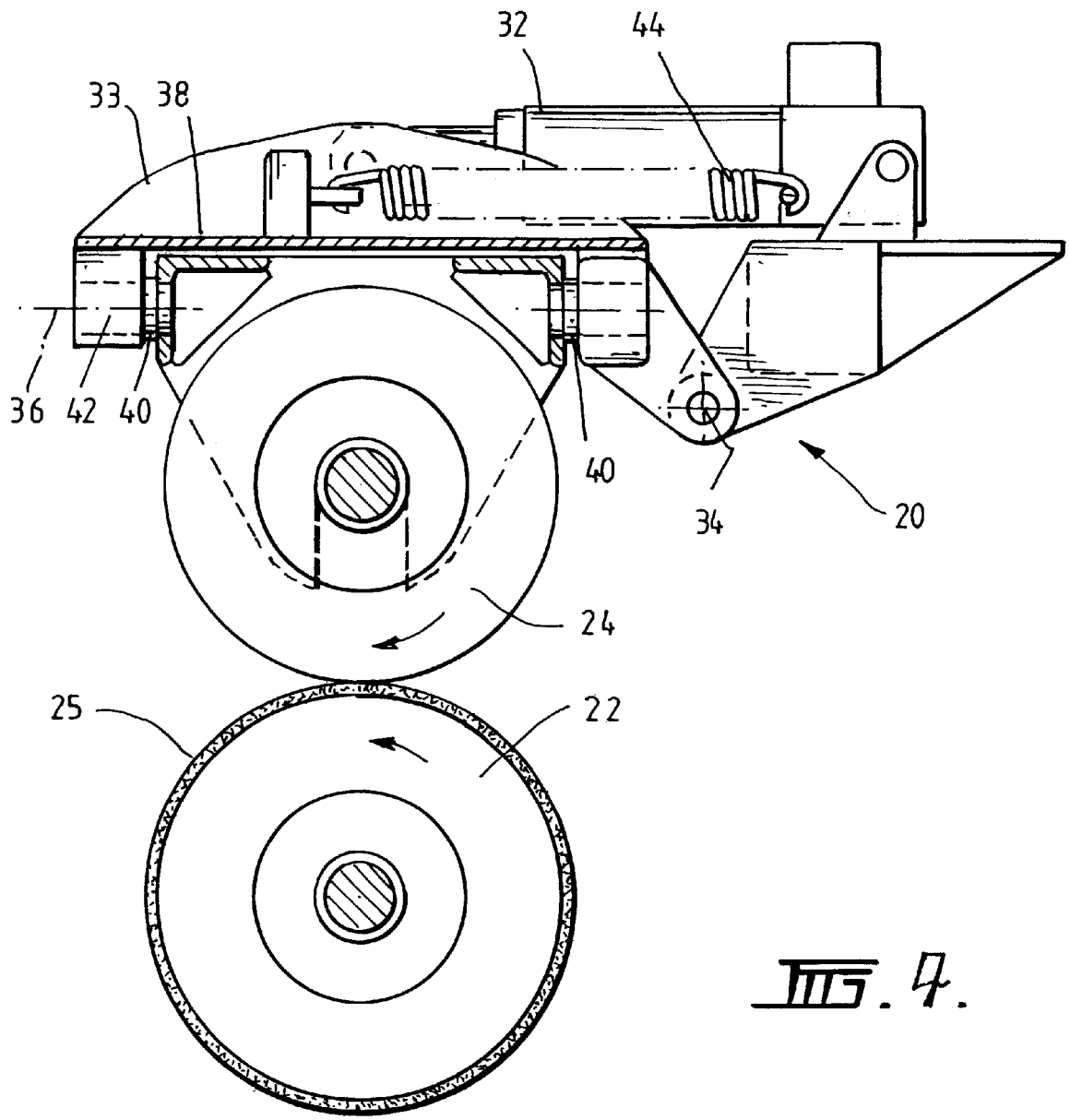
FIG. 4 is a side elevation of the apparatus illustrated in FIG. 3.
Figure 5:
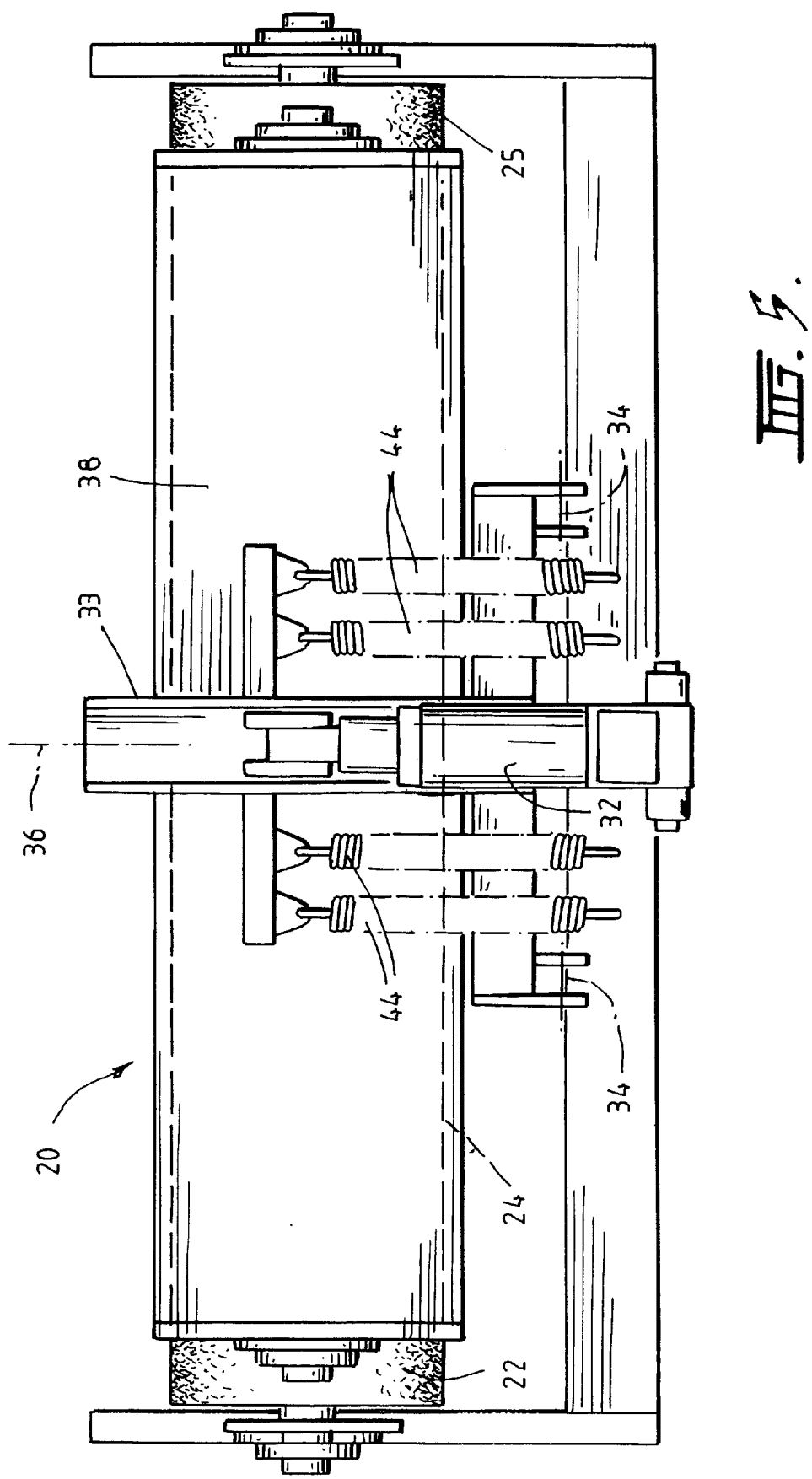
FIG. 5 is a plan view of the apparatus illustrated in FIG. 3.

A preferred embodiment of the hay conditioning apparatus 20 in accordance with the present invention is illustrated in FIGS. 3, 4 and 5. The apparatus 20 comprises a first roller 22 which is rotatably mounted in a fixed mounting, and a second counter-rotating roller 24 which is rotatably mounted in connection with a moveable mounting 26. The second roller 24 is in rolling contact with the first roller 22 and is adapted to receive pre-cut hay therebetween for conditioning. The moveable mounting 26 allows the second roller 24 to be displaced relative to the first roller 22 as the hay passes between the rollers, and also includes a compression means 30 for applying a compression force to the second roller 24. In this embodiment compression means 30 includes an hydraulic cylinder 32. As the pre-cut hay passes between the rollers 22 and 24 it is subject to a predetermined compression force sufficient to substantially flatten any green nodes on the hay and thereby accelerate drying of the hay.

Preferably, both rollers 22 and 24 are driven by a suitable motor coupled to the rollers via a drive transmission (not illustrated). In this connection, the conditioning apparatus 20 may be incorporated in a mowing machine, or constructed as a stand-alone unit. The rollers 22 and 24 are both preferably provided with a substantially smooth or plain exterior surface, or alternatively the external surface may be grooved depending on the type of plant fodder being conditioned. Both rollers 22 and 24 are manufactured from steel, although rubber or synthetic lagged rollers may also be employed.

The fixed roller 22 of this embodiment has a rubber surface 25 (see FIG. 4), whereas the compression roller 24 is provided with a steel surface. A key feature of the improved conditioning apparatus 20 is that the compression roller 24 exerts sufficient force on the pre-cut hay to substantially completely flatten the green nodes on the plant stems. When the green nodes on the plant stems are rolled flat, moisture retained within the nodes is allowed to escape to atmosphere more quickly than when the nodes remain whole. Hence, the flattened nodes should dry as quickly as the rest of the plant, It is anticipated that this method of conditioning cereal or grass will reduce drying times by between 25%–50%, compared to traditional conditioning.

In order to exert sufficient compression force on the pre-cut hay there is a trade-off in the amount of force required from the hydraulic cylinder 32 and the cushioning effect of the rubber lagging on the rollers 22 and 24. If both rollers are lagged with 16 mm 60 Duro rubber, then approximately 1700 psi of pressure is required in the hydraulic cylinder 32. (60 Duro is a measure of hardness of the rubber, where Durometer is a standard unit of rubber hardness). The rubber employed on the rollers is preferably relatively hard with a minimum hardness of 40 Duro and a maximum hardness of 80 Duro. The optimum hardness of the rubber lagging is between 50–60 Duro. Preferably between 10 and 20 mm of lagging is provided on both rollers, more typically 12 mm thickness lagging. On the other hand, with one steel roller and the other roller having 20 mm of rubber lagging (60 Duro) only 1500 psi of cylinder pressure is required to squash the hay completely, including the green nodes on the plant stems. With lagging on both rollers the cylinder pressure needed may increase to as high as 2000 psi. However, even if both rollers are steel (without rubber lagging) the cylinder pressure required to totally squash the green nodes is generally not less than 1000 psi.

The pressure required also depends on the length and to some extent on the diameter of the rollers. The linear specific pressure at the point of contact between the rollers can be calculated using the following formula:

$$P_{1s}=F/L$$

where $P_{1s}$=linear specific pressure

F=the downward force applied to the compression roller 24 by the hydraulic cylinder 32.

L=the length of the surfaces of the rollers in rolling contact

The downward force F applied to the compression roller 24 is somewhat less than the force generated by the hydraulic cylinder 32 due to the mechanical advantage of the intervening mechanical system. The mechanical advantage of the system in the illustrated embodiment has been calculated empirically to be 0.5875. Using a 3.5 inch (88.9 mm) cylinder, and cylinder pressure of 1700psi, F=42732N. If the length of the rollers is 1500 mm, the linear specific pressure can be calculated as follows:

$$P_{1s}=42732/1500=28.49 N/mm$$

If the cylinder pressure is reduced to 2000 psi the linear specific pressure $P_{1s}$=33.52N/mm, whereas if the cylinder pressure is reduced to 1000 psi, $P_{1s}$=16.76 N/mm. In order to ensure that the green nodes are substantially flattened it is preferred to have a linear specific pressure $P_{1s}$ falling within the range of approximately 17 to 32 N/mm, more preferably approximately 20 to 30 N/mm.

The diameter of the rollers 22 and 24 is typically between 200 mm to 900 mm. In the illustrated embodiment, the outside diameter of the first roller 22 (with lagging) is 430 mm, whereas the outside diameter of the second roller 24 (without lagging) is 406 mm. Preferably the rubber lagging 25 on the first roller 22 is substantially smooth. However, the provision of shallow grooves to aid feeding is acceptable.

The moveable mounting 26 for the second (compression) roller 24 in the illustrated embodiment comprises a pivotable support arm 33 having the compression roller 24 rotatably mounted thereon, and having the other end pivotally connected to a pivot point 34 which is spaced from the axis of rotation of the compression roller 24. In this way, the support arm 33 acts as a lever for applying a compression force to the compression roller 24 by means of the hydraulic cylinder 32. The magnitude of the compression force applied to the second roller 24 can be varied by changing the pressure of hydraulic fluid supplied to the cylinder 32. An hydraulic accumulator (not illustrated) is provided to maintain the hydraulic pressure to the cylinder 32.

Advantageously the moveable mounting 26 for the compression roller 24 is pivotable about two perpendicular axes 34 and 36. As noted above, the pivotable arm 33 is pivotally connected to a pivot point on the first axis 34. Moveable mounting 26 further comprises a rockable support frame 38 in which the compression roller 24 is rotatably mounted. Support frame 38 is pivotally couple to the support arm 33 so as to be pivotable about the second axis 36 which is perpendicular to the first axis 34. Stub axle 40 are provided on both sides of the support frame 38 and are pivotally received within bearing 42 provided on the support arm 33. This arrangement allows the support frame 38 and compression roller 24 to "rock" about axis 36. Hence, in the event that a slug or oversized mat of crop material passes between the rollers 22 and 24, only that side of the roller 24 in the region of the slug needs to lift in order to allow the slug to pass through. In this way, conditioning of crop material passing between the rollers elsewhere is not compromised. Also, the rollers are less likely to jam since it is not necessary for the whole of the compression roller 24 to be lifted, only tha side of the roller in the region of the blockage or obstacle.

In the illustrated embodiment, hydraulic cylinder 32 is a single acting cylinder, and hence a series of return springs 44 are provided to generate a lifting force to lift the moveable mounting 26 when the pressure of hydraulic fluid supplied to the cylinder 32 is reduced. However, clearly a double acting cylinder could be employed in place of the single acting cylinder 32.

Figure 6:
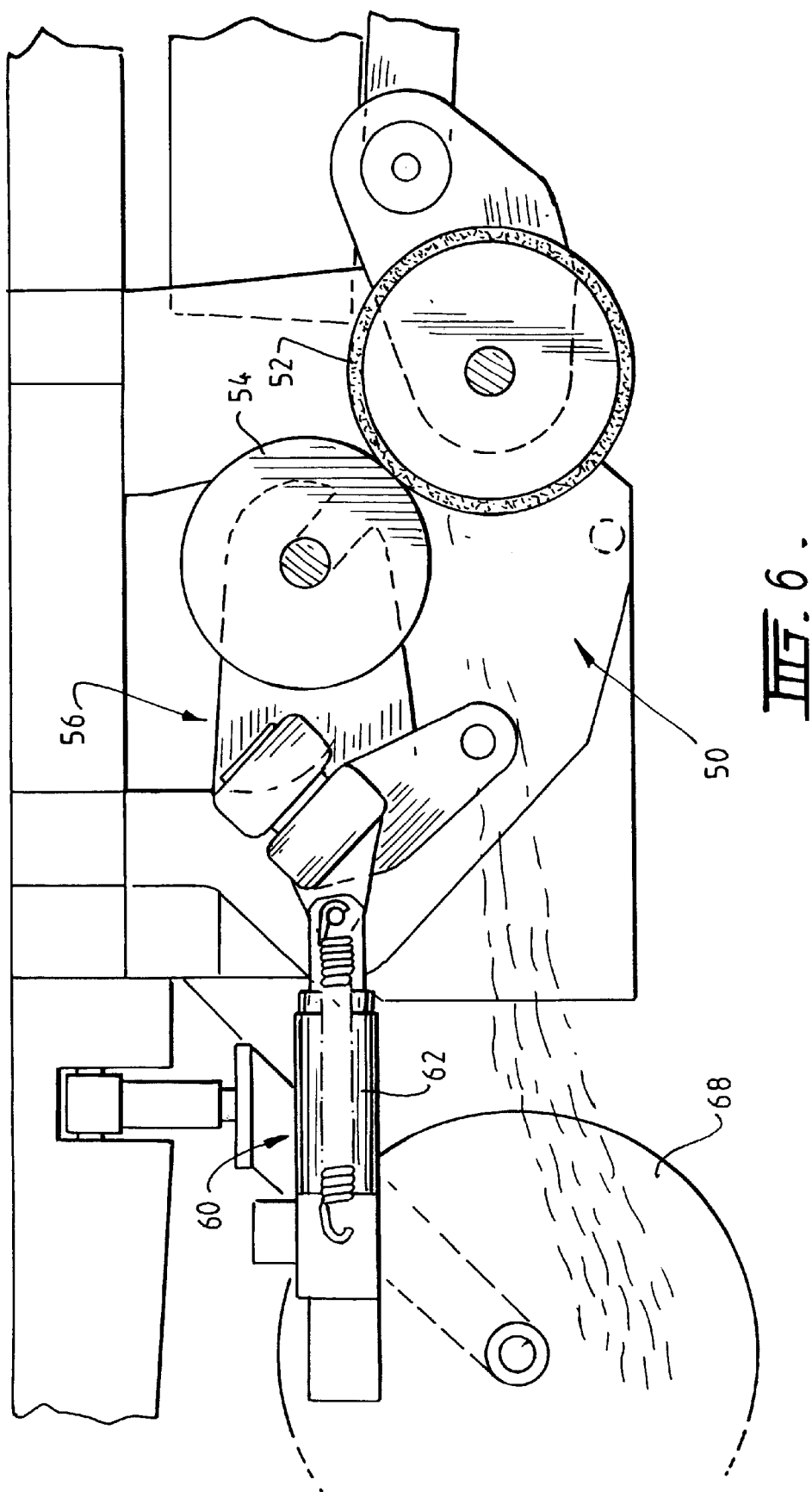
FIG. 6 illustrates an embodiment of the hay conditioning apparatus built into a mowing machine.

As noted above, the hay conditioning apparatus of the invention may be built as a stand-alone unit, or may be incorporated in an existing harvester or mowing machine. FIG. 6 illustrates an embodiment of the hay conditioning apparatus 50 built into the front end of a New Holland self propelled windrowing machine. As with the previous embodiment, the hay conditioning apparatus 50 comprises a first fixed roller 52 and a second moveable (compression) roller 54 which is rotatably mounted in a moveable mounting 56 so that as hay passes between the rollers the second roller 54 can be displaced relative to the first roller 52. Compression means 60 of this embodiment comprises an hydraulic cylinder 62 for applying a compression force to the second roller 54. As the pre-cut hay passes between the rollers 52 and 54 it is subject to a predetermined compression force sufficient to substantially flatten any green nodes on the hay and thereby accelerate drying of the hay.

The conditioning apparatus 50 may also include a means 68 for feeding the pre-cut hay to the first and second rollers 52 and 54. In the illustrated embodiment, a rotatable rake drum 68 is provided for picking up the pre-cut cereal or grass and feeding it between the first and second rollers 52 and 54.

It will be apparent from the above description of a preferred embodiment of the method and apparatus of hay conditioning, that it provides at least the following advantages:

(i) it dramatically reduces the present drying/curing time for hay;

(ii) it thereby reduces the risk of damage to the hay due to rain;

(iii) it may also assist in minimizing damage to hay by squeezing excess water (after rain) from the stems and leaves of the hay;

(iv) it is thought that this method of conditioning may also improve the quality of the hay regardless of rain damage; and, (v) it can be readily incorporated in existing mowing machines and/or conditioners.

Numerous variations and modifications will suggest themselves to persons skilled in the agricultural arts, in addition to those already described, without departing from the basic inventive concepts. For example, it will be evident that this method of conditioning may also be beneficial for other types of hay such as, for example, lucerne, clover, sudan/sudax etc. The method may also involve passing the hay through more than one pair of rollers in order to flatten all the green nodes on the plant stems. All such variations and modifications are to be considered within the scope of the present invention, the nature of which is to be determined from the foregoing description and the appended claims.

The claims defining the invention are as follows:

1. An apparatus for conditioning hay, the apparatus comprising:

a first roller mounted for rotation and a second counter-rotating roller mounted in rolling contact with the first roller, said first and second rollers being adapted to receive pre-cut hay therebetween;

wherein said first roller is rotatably mounted in a fixed mounting and said second roller is rotatably mounted on a moveable mounting such that the second roller is displaceable relative to the first roller as hay passes between said rollers during use; and a compression device for applying a compression force to the second roller so as to compress hay as the hay passes through said rollers during use;

wherein said moveable mounting comprises a pivotable support arm pivotably mounted at a location spaced from the axis of rotation of the second roller, and a rockable support frame pivotably mounted on a pivot axis disposed perpendicularly to the axis of rotation of the second roller on said support arm, the second roller being rotatably mounted on said support frame, the support frame being able to pivot during use about said pivot axis substantially perpendicular to the axis of rotation of the second roller and the second roller is thereby able to rock about said pivot axis in order to facilitate passage between said rollers of an object during use; and wherein, during use, as the hay passes between the rollers it is subject to a predetermined compression force sufficient to substantially flatten any nodes on the hay and thereby accelerate drying of the hay.

2. An apparatus for conditioning hay, the apparatus comprising:
- a first roller mounted for rotation and a second counter-rotating roller mounted in rolling contact with the first rollers, said first and second rollers being adapted to receive pre-cut hay therebetween;
- wherein said first roller is rotatably mounted in a fixed mounting and said second roller is rotatably mounted in a moveable mounting such that the second roller is displaceable relative to the first roller as hay passes between said rollers during use; and
- wherein said moveable mounting comprises a pivotable support arm pivotally mounted at a location spaced from the axis of rotation of the second roller, and a rockable support frame pivotally mounted on a pivot axis disposed perpendicularly to the axis of rotation of the second roller on said support arm, the second roller being rotatably mounted on said support frame;
- the support frame being pivotable during use about said pivot axis substantially perpendicular to the axis of rotation of the second roller and the second roller is thereby able to rock about said pivot axis in order to facilitate passage between said rollers of an object during use.

3. An apparatus for conditioning hay as defined in claim 2 wherein said moveable mounting includes a compression device for applying a compression force to the second roller.

4. An apparatus for conditioning hay as defined in claim 3, wherein the compression force applied to the second roller is variable to suit the type of crop material passing through the apparatus.

5. An apparatus for conditioning hay as defined in claim 3, wherein said predetermined compression force is measured as the linear specific pressure applied to the crop material as it passes between the rollers, and wherein said linear specific pressure lies within the range of 17 to 32 N/mm.

6. An apparatus for conditioning hay as defined in claim 5, wherein the linear specific pressure applied to the crop material as it passes between the rollers lies within the range of 20 to 30 N/mm.

7. An apparatus for conditioning hay as defined in claim 2, wherein at least one of the first and second rollers is covered with a rubber or synthetic lagging material.

8. An apparatus for conditioning hay as defined in claim 7, wherein the outer surfaces of said first and second rollers are substantially smooth.

9. An apparatus for conditioning hay as defined in claim 2, wherein the apparatus further comprises means for feeding pre-cut hay between said rollers.

* * * * *